Dec. 21, 1926.

R. CHILTON

UNIVERSAL JOINT

Filed April 3, 1925    2 Sheets-Sheet 1

1,611,160

INVENTOR
Roland Chilton
BY
ATTORNEY

Dec. 21, 1926.                                              1,611,160
R. CHILTON
UNIVERSAL JOINT
Filed April 3, 1925        2 Sheets-Sheet 2

INVENTOR
Roland Chilton
BY
ATTORNEY

Patented Dec. 21, 1926.

1,611,160

UNITED STATES PATENT OFFICE.

ROLAND CHILTON, OF KEYPORT, NEW JERSEY, ASSIGNOR TO HEALEY-AEROMARINE BUS COMPANY, INC., A CORPORATION OF NEW YORK.

UNIVERSAL JOINT.

Application filed April 3, 1925. Serial No. 20,528.

This invention is intended to be of general application where power has to be transmitted between two rotary members having their axes intersecting at substantial angles, and comprises more specifically, improvements in the method of applying power to steerable vehicle wheels. The invention features improvements in a type of universal joint having a pair of intermediate members pivoted together transaxially of axes of oscillation with a driving and a driven member respectively.

In such constructions, the condition of constant velocity ratio between the driving and driven member is satisfied when the intermediate members rotate in a plane bisecting the angle between the shaft axes. In some of the types of the prior art the axes of articulation of the intermediate members to the driving and driven shafts respectively are co-axial, and a special means for restraining the intermediate members to an angular position midway between the driving and the driven member is then necessary. If on the other hand, the axes of oscillation between the intermediate members and the driving and driven members be spaced apart axially of the latter and these members be supported for intersection of their axes substantially midway between these separated axes, then the intermediate members will be restrained to the desired midway position without recourse to other controlling means and this is one of the primary objects of the invention.

Another object of this invention is to provide a universal joint which will connect the driving and driven members against separation under substantial axial loads. To this end the intermediate members may be made rigid axially of the joint so that they define the spaced apart position of the driving and driven members. It will be seen that this construction involves a slight approach of the driving and driven member pivot axes during orientation of the intermediate members to an angular position. It is necessary to restrain the members to axial intersection substantially at the center line of the joint and when this is done, as is the case in the prior art, by bearings supported in housings connected for relative oscillation about a fixed center, this slight approach of the pivot axes when the joint moves to an angular position is difficult to provide for, since the tendency of such bearings is to combat the natural action of the joint in causing this slight variation in distance between the pivot axes and the point of intersection.

In certain known types of joint where the connected shafts are restrained axially by bearing mountings, the two sides of each intermediate member have been relatively pivoted and a ball or similar type of joint provided to articulately connect these two intermediate members together so that the joint was flexible for axial extension. This double pivoting complicates the construction and prejudices the durability of the joints by cutting the available bearing surface into two offset portions.

Another one of the prime objects of this invention, therefore, is to avoid these disadvantages, and accordingly the intermediate members are each in one rigid and rugged piece well adapted to maintain the shafts against end displacement, while the shafts are supported for intersection substantially at the center of the joint by improved means forming a part of this invention, which means permit the shafts the necessary axial freedom to follow the axial location imposed by the rigid intermediate members.

It will be seen that by the construction herein disclosed, the combination of a relatively rugged and simple connection for restraining the shafts to axial intersection at the desired point with an axial separation of the connections with the driving and driven members is utilized to effect the control of the intermediate members, and thus the separate jointed control members of the prior art are avoided.

It will be further seen that, by connecting the shafts for axial intersection within the joint by a means permitting such axial displacement as is imposed by the intermediate members, these may be made of simple and more rugged construction than is possible where the necessary axial freedom is obtained by additional articulation within these members.

Further objects of the invention are to provide a joint suited to extremely large angles and having large bearing surfaces and one which will at the same time contain few parts of relatively small over-all size and also to facilitate assembly.

It will be seen that the joint comprises three axes of orientation, each having a pair of aligned pin and bushing bearings, and the objects just mentioned may be carried out in a preferred manner by utilizing a construction wherein these bushings are ruggedly mounted in the members without recourse to a two-piece construction for purposes of introducing the parts into assembled relation as will be more fully described hereinafter.

Various other objects and advantages of the invention will be in part apparent from an inspection of the accompanying drawings, and in part will be more fully set forth in the following particular description of one form embodying my invention, and the invention also consists in certain new and novel features of construction and combination of parts hereinafter set forth and claimed.

In the drawings:—

Figure 1:
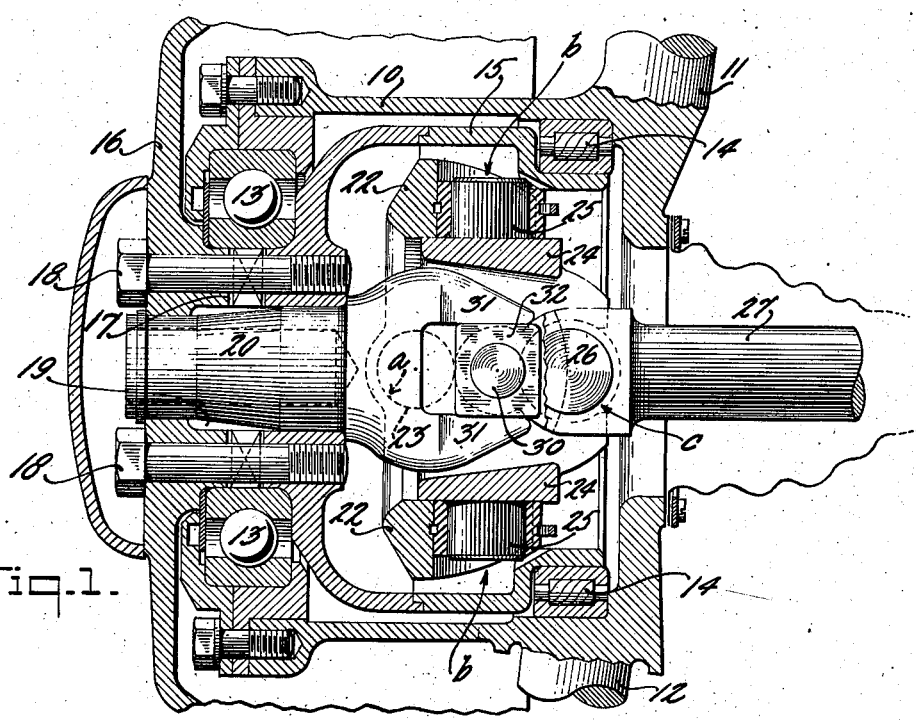
Figure 1 is a fragmentary vertical section of a vehicle driving wheel mounted for rotation on outer and inner spaced apart bearings, and illustrates the improved form of universal joint in a position wherein the driving and driven members are disposed coaxially.
Figure 2:
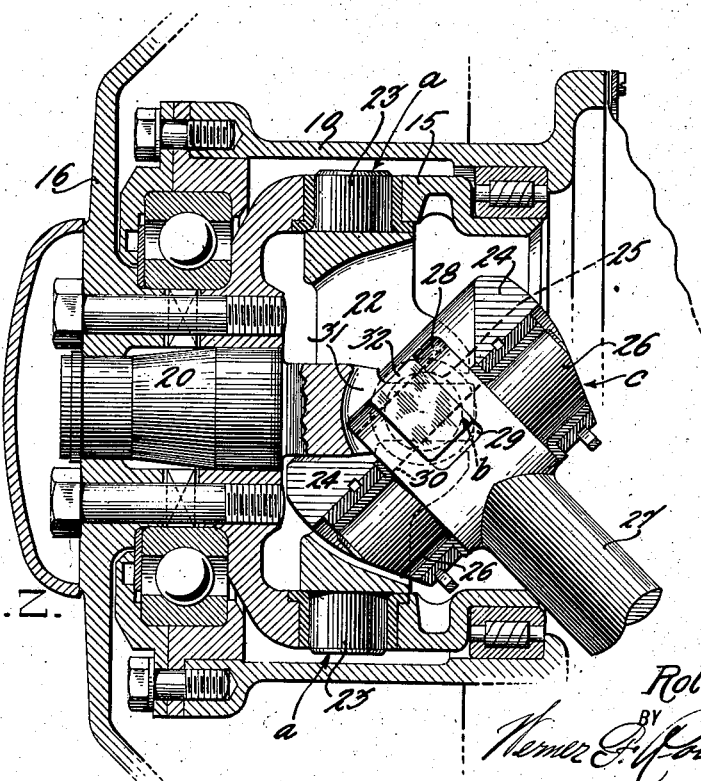
Figure 2 is a horizontal section similar to that of Fig. 1 and shows the driving member disposed approximately at 45 degrees to the axis of the driven member.

In the present instance with reference to Figs. 1 and 2, 10 designates a wheel hub housing provided with steering pivots 11, 12, by which the housing is supported from the vehicle.

Mounted for rotation within the bearings 13, 14 is the wheel hub 15. A wheel disc 16 is secured to the hub 15 in any suitable manner, but preferably by the spline connection 17 and the bolts 18. These two members in their connected relation will be conveniently referred to hereinafter as the driven member.

In a suitable bore 19, disposed axially of the hub 15 and the disc 16 there is fitted a bifurcated member 20 secured against end motion by suitable shoulders and mounted in a rotationally free manner so as to permit a slight oscillation of this member which may occur due to variations in velocity ratio.

Secured within the hub 15 in an oscillatory manner is an intermediate member 22 having trunnions 23 journalled in the hub and extending diametrically thereof, which connection I will designate as connection (a.)

Figure 5:
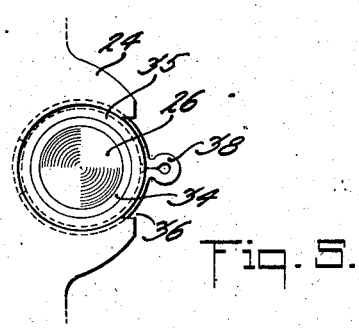
Figure 5 is a plan view of Fig. 4.
Figure 6:
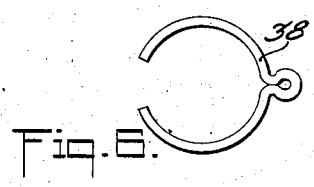
Figure 6 is a detail view of the ring which secures the bushing.

A second intermediate member 24 having trunnions 25 is secured to the first mentioned member 22 in a manner so as to permit relative oscillation, the trunnions 25 being journalled in suitable bearings such as shown in Fig. 5 which will be more fully described hereinafter. The connection between these two intermediate members (connection b) is disposed transaxially of the connection (a).

Within the second intermediate member 24 there are journalled the cross pins 26 of the drive shaft 27 forming a connection hereinafter referred to as (c). It will be seen that the two connected intermediate members form what may be termed a gimbal ring structure. Special attention is called, however, to the disposition of the connections (a), (b), and (c) relatively to one another as it is to be noted that they are spaced apart to a substantially equal degree axially of the hub 15.

The end of the drive shaft 27 is fashioned into a yoke 28 providing a slot 29 in which there is secured by means of a pin 30, a block 32 which is mounted for rotational freedom. The block 32 is fitted so as to slidably engage the jaws 31 of the bifurcated member 20, and it should be noted that the axis of the pin 30 is normally approximately central between the connections (a) and (c). It will thus be seen that the axial intersection of the driving and driven members will be restrained during operation to be substantially at the center of the joint for the purpose hereinbefore stated, also that the block 32 by reason of its sliding engagement with the jaws of the bifurcated member 20 will permit such slight axial displacement of the drive shaft as is imposed by the intermediate members due to their various angular positions during operation.

It will be seen that the gimbal ring structure shown supports the drive shaft against sideways displacement in the plane of the spaced apart articulations of the driving and driven members, but that it affords no such support against translation normal to this plane. In other words, the gimbal ring holds the drive shaft rigid for intersection in the plane of Fig. 1 but not in the plane of Fig. 2. Accordingly, this invention includes such special means as the fork and block shown and described for the support of the shafts for intersection in this last said plane which means is preferably flexible as to the previously mentioned plane of intersection, so that there will be no damage from conflicting action between the joint and the supporting means such as might be caused by possible inaccuracies in the parts. The preferred construction accordingly, features the pin 30 in the drive shaft 27 disposed parallel to the axis of connection (c) and the block 32 pivoted to this pin and engaging for oscillation the jaws 31 carried by the driven member.

In the showing, in order to afford large surfaces in contact, the block in question is made flat-sided, and hence in itself incidentally constitutes a small and crude type of universal joint of a character, however, which does not have constant velocity ratio. In operation a slight oscillation will occur at this point, due to the variations in velocity ratio in the shaft anchoring structure and for this reason the member 20 is mounted in a rotationally free manner.

Figure 3:
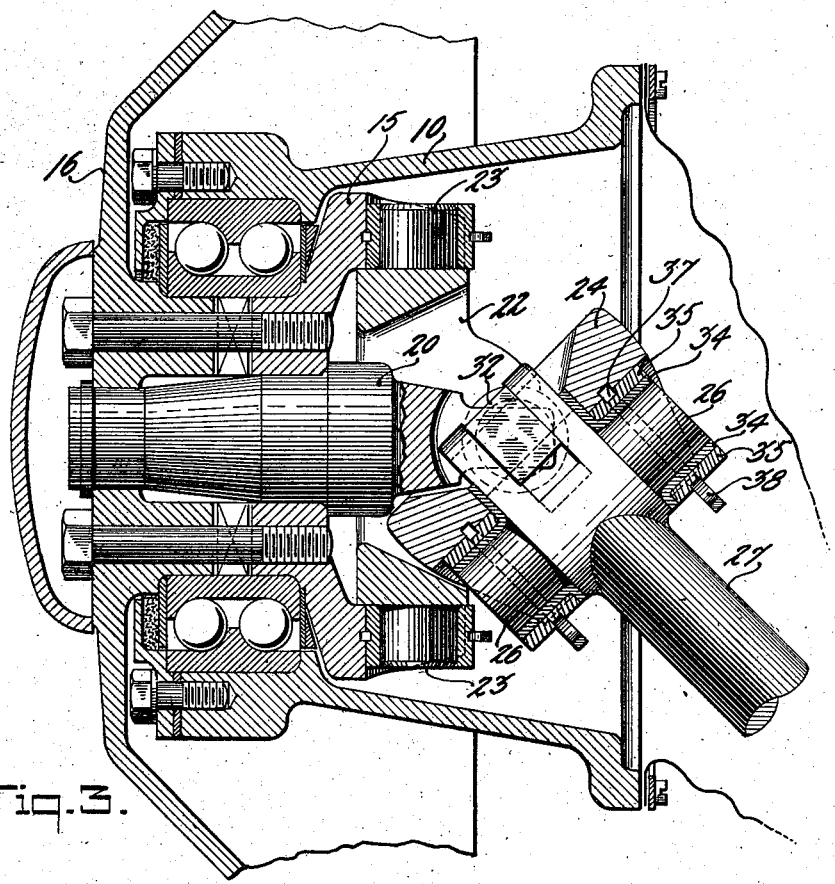
Figure 3 is a sectional view in the same plane as that of Fig. 2 and illustrates an alternative mounting for the driven member.
Figure 4:
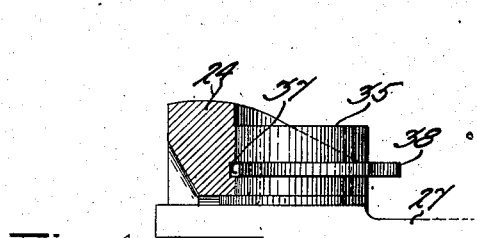
Figure 4 is a partly sectional view showing a trunnion on the drive shaft and the manner in which the bushing is secured in its bore.

In Figs. 3, 4, 5, and 6 there is shown the manner in which the integral trunnions or pins 26 of one member can be entered into the bores of the other member without resorting to a two-piece construction. With reference to Fig. 3 the cross pins 26 are preferably provided with hardened and ground liners 34. The member 24 (Fig. 5) is bored to the diameter of the bushings 35 and has a side opening 36 which is of lesser diameter than the bore, but wide enough to pass the pins 26 with their associated liners 34. After the pins 26 with their associated liners 34 have been introduced through the opening 36, the bushings 35 are slipped axially over the pins 26 which will prevent the pins from being withdrawn through said opening.

The bushings 35 are provided with a circumferential recess 37 which registers with a similar recess formed in the member 24, into which recesses a spring ring 38 is introduced to retain the parts in assembled relation.

Thus the integral trunnions or pins of one member can be entered into the bores of the other member sideways of the trunnion axes and then positively assembled into position by the axial introduction of the bushings, which are firmly embraced by the engaging member over substantially more than half their circumference.

Variations may be resorted to within the scope of the invention and portions of the improvements may be used without the others, whilst not departing from the spirit of the invention.

Having thus described my invention, I claim:—

1. In a universal joint, a pair of intermediate members drivably pivoted together for relative oscillation, driving and driven members drivably pivoted respectively to said intermediate members on spaced apart axes normal to the first pivots and means for maintaining the axes of the driving and driven members in intersection substantially on the axis of the pivot between the intermediate members.

2. In a universal joint, the combination of, a driving member, a driven member, a pair of intermediate members to which are respectively pivoted the driving and driven members on spaced apart axes, a pivotal connection between the intermediate members at right angles to said axes, and means to hold the shafts co-axial at the plane of said pivotal connection.

3. In a universal joint, the combination of a pair of intermediate members pivotally connected, a drive member pivotally connected to each intermediate member on an axis normal to and spaced apart from the axis of the first said pivot, and a connection means between the drive members for restraining the same to intersect substantially in the mid-plane of the joint.

4. In a universal joint having pivotally connected intermediate drive members respectively pivoted to a driving and driven member respectively, a means for maintaining the intermediate members to bisect the angle between the shafts, comprising, relatively spaced apart pivots connecting each driving member to its intermediate member, and means to maintain the intersection of the shafts to be at a point intermediate of said spaced apart axes.

5. In a universal joint, a driving member, a first intermediate member pivoted for unitary rotation with and relative oscillation to the driving member, a driven member, a second intermediate member pivoted for unitary rotation with and relative oscillation upon the driven member, said pivots being spaced apart axially of the joint, a pivotal connection between the intermediate members axially intermediate said spaced apart pivots, and means adapted to restrain the shafts to intersect substantially at the axis of the last said connection.

6. In the art of connecting two power members having intersecting axes for uniform rotation, a pair of intermediate members pivotally connected, means for maintaining the intersection of the power members to be substantially at the axis of said connection, and pivotal connections between each intermediate member and the associated power member spaced apart axially of the power members, last said connections being normal to the axis of the first said pivotal connection.

7. A universal joint comprising a pair of rigid frames pivotally connected upon a common axis, pivot means on each frame rigidly maintained normal to and spaced apart from said axis, a pair of power members respectively pivoted to said frames, and means to maintain the intersection of the power members to be substantially at the common axis.

8. In a universal joint, a pair of members pivoted together and rigidly carrying pivot means normal to and spaced apart from the first said pivot, power members engaging the last said pivot means, the whole adapted to locate the power means in an endwise sense, in combination with axially free supporting means adapted to maintain the axes of the driving and driven members in intersection substantially at the center of the joint.

9. In a device of the character described, the combination of a pair of rotatable drive members adapted for relative angular displacement, a pair of frame members respectively pivoted to the drive members at axially separated points thereon and mutually pivoted for relative oscillation on an axis disposed intermediate and normal to the separated axes of their connection with the drive members, said drive members also articulated together by a non-driving connection adapted to maintain the axial intersection of said members to be at a point substantially central between their connections with the frame members and to permit axial displacement of the drive members relative to one another.

10. In a universal joint, a driving and a driven member, a pair of intermediate members respectively pivoted in the same plane to the driving and the driven member at spaced apart points, said intermediate members pivoted together in a plane axially central between said spaced apart points and normal to the first said plane, and flexible means connecting the driving and the driven members to maintain the point of intersection of their axes to be coplanar with the pivot between the intermediate members.

11. In a universal joint between two power elements, a pair of intermediate members each comprising a one-piece structure including a pair of aligned bearings and a pair of aligned trunnions normal to and spaced apart from the bearings axially of the power elements, the bearings in one of said members engaging the trunnions of another, a first power element having trunnions engaging the bearings of one of the members and a second power element having bearings engaging the trunnions of the other of said members, in combination with means for articulately supporting the connected ends of the power elements against lateral displacement.

12. In apparatus of the class described, the combination of, a driving member provided with cross pins and having a block mounted for rotational freedom, a driven member provided with bearings, an element having connection with said driven member and provided with a portion adapted to engage said block so as to restrain relative lateral motion of said members, a first intermediate member mounted for oscillation on the cross pins of the driving member, a second intermediate member mounted for oscillation in the bearings of the driven member, and a pivoted connection between the intermediate members.

13. In a universal joint having a pair of pivotally connected intermediate elements connected for oscillation to a driving and driven member respectively, a supporting connection between said driving and driven members comprising a block mounted for rotational freedom in one of said members and engaged in a slidable manner by the other of said members for the purpose of preventing relative lateral displacement of the members whilst permitting limited axial displacement.

14. In apparatus of the class described, a driving member, a driven member, a pair of intermediate members to which the driving and driven members are respectively pivoted at spaced apart points, a pivoted connection between the intermediate members disposed substantially central between and transaxially to the pivots of the driving and driven members, an oscillatory connection between said driving and driven members comprising a block mounted for rotational freedom in one of said members and engaged in a slidable manner by the other of said members for the purpose of preventing relative lateral displacement whilst permitting limited axial displacement of said driving and driven members.

15. In a universal joint including a driving and driven member, a connection between said members within the joint and adapted to permit relative axial displacement and to restrain relative lateral movement of the members, said connection comprising a block pivoted in the end of one of the members and engaged by the other of said members.

16. In apparatus of the class described, the combination of a housing, a wheel carrying member rotatably supported in said housing, a first intermediate member mounted for oscillation in the wheel carrying member by a connection designated as (a), a second intermediate member mounted for oscillation in the first member by a connection designated as (b), a driving member mounted for oscillation in the second said member by a connection designated as (c), the connection "b" being midway between and transaxially disposed of the said connections "a" and "c", a forked member mounted in a rotationally free manner in the wheel carrying member and co-axial therewith, a block mounted in a rotationally free manner in the driving member and slidably engaged by the forked member.

17. In apparatus of the class described, a driving member, a driven member, a pair of intermediate members to which the driving and driven members are respectively pivoted at spaced apart points, a pivoted connection between the intermediate members disposed subtantially central between and transaxially of the pivots of the driving and driven members, a means to restrain the driving and the driven members against lateral movement relative to one another said means comprising an element pivoted to one of the members and engaged by the other of said members.

18. In a joint having a pair of pivotally connected intermediate members respectively connected to a driving and a driven member at spaced apart axes, means for maintaining the axes of rotation of the driving and driven members to intersect at the center of the joint said means comprising a cross pin in the driving member, a block freely mounted on the pin, a jaw engaging the block and mounted to be coaxial with the driven member and for relative rotation therein.

19. In a universal joint including a driving and driven member, a connection between said members within the joint and adapted to permit relative axial displacement and restrain relative lateral movement of the members, said connection comprising a first element mounted for rotational freedom in one of said members, a second element pivotally mounted in the other of said members and adapted to be slidably engaged by the first said element.

Signed at Keyport, in the county of Monmouth, and State of New Jersey this 6th day of January A. D. 1925.

ROLAND CHILTON.